May 22, 1951 W. O. CROSSMAN 2,554,297
RESILIENT CLAMPING DEVICE FOR BONDING
BRAKE LININGS TO BRAKE SHOES
Filed July 5, 1947 3 Sheets-Sheet 1

INVENTOR.
WARD O. CROSSMAN
BY
*D. J. Plante*
ATTORNEY

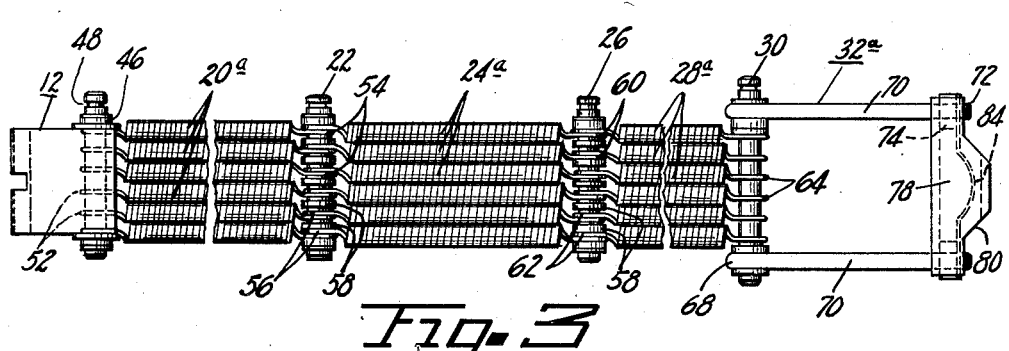

INVENTOR.
WARD O. CROSSMAN
BY
T.J. Plante
ATTORNEY

Patented May 22, 1951

2,554,297

UNITED STATES PATENT OFFICE 2,554,297

RESILIENT CLAMPING DEVICE FOR BONDING BRAKE LININGS TO BRAKE SHOES

Ward O. Crossman, South Bend, Ind., assignor to Bendix Aviation Corporation, South Bend, Ind., a corporation of Delaware Application July 5, 1947, Serial No. 759,023

13 Claims. (Cl. 154—1)

This invention relates to a resilient clamping device which is intended to be used to retain a brake lining segment temporarily in tight engagement with a brake shoe rim, in order that heat can be applied to effect the cure of a thermosetting adhesive which has previously been placed between the lining segment and the shoe rim.

It has been proposed that a thermosetting adhesive, or cement, be used to secure brake lining segments to brake shoe rims, in order to avoid the use of rivets. To obtain an adequate bond with the thermosetting adhesive, it is necessary first to place the uncured adhesive between the lining segment and the shoe rim, and then to heat the adhesive under pressure until it has melted to form a bond and has subsequently become infusible. During the heating operation, suitable means must be provided for exerting a radial force which holds the lining segment tightly against the shoe rim. In order to obtain a satisfactory bond, this radial force must consist of a reasonably uniform pressure over the entire surface of the lining. Furthermore, the force should be resilient, in order to provide an automatic "follow-up" motion to maintain the required pressure when the bonding cement melts under the influence of heat.

Furthermore, because of the large number of clamping devices which are required for extensive production of brake shoes, the construction of these devices should be simple and easy to operate, and should include no large masses of metal to absorb and radiate heat, as this would prolong the curing cycle and increase heating costs.

It is an object of the present invention to provide a resilient clamping device which will meet the foregoing requirements.

Another object of the present invention is to provide a resilient clamping device which will exert the necessary radial pressure although the device extends circumferentially along the periphery of the shoe from one end of the shoe to the other.

Yet another object is to provide a simple and easily operated tool for attaching the resilient clamping device to, and removing it from, the brake shoe assembly.

Other objects and advantages of the present invention will become apparent during the following description, reference being had therein to the accompanying drawings, in which:

Figure 3 is a plan view of a modified arrangement of the resilient clamping device, this arrangement being particularly applicable to shoes having relatively long segments of lining;

Figure 4 shows the resilient clamping device of Figure 3 applied to the brake shoe assembly;

Figure 5 is a side view of a portion of the clamping device and of the tool which is used in applying and removing the clamping device, the tool being shown in position for the assembling operation;

Figure 1:
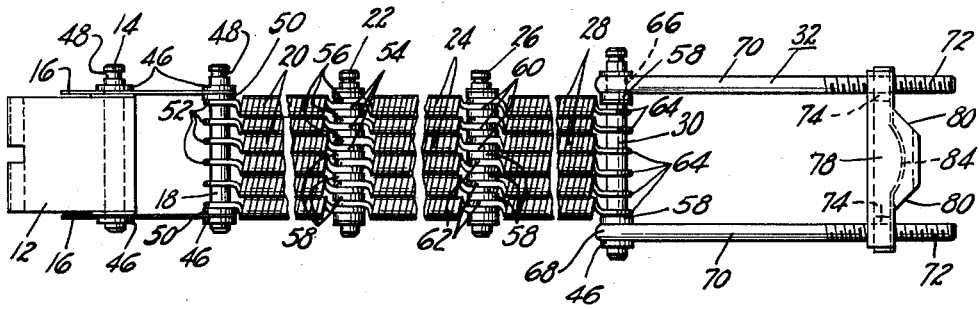
Figure 1 is a plan view of the resilient clamping device, shown apart from the brake shoe assembly.
Figure 2:
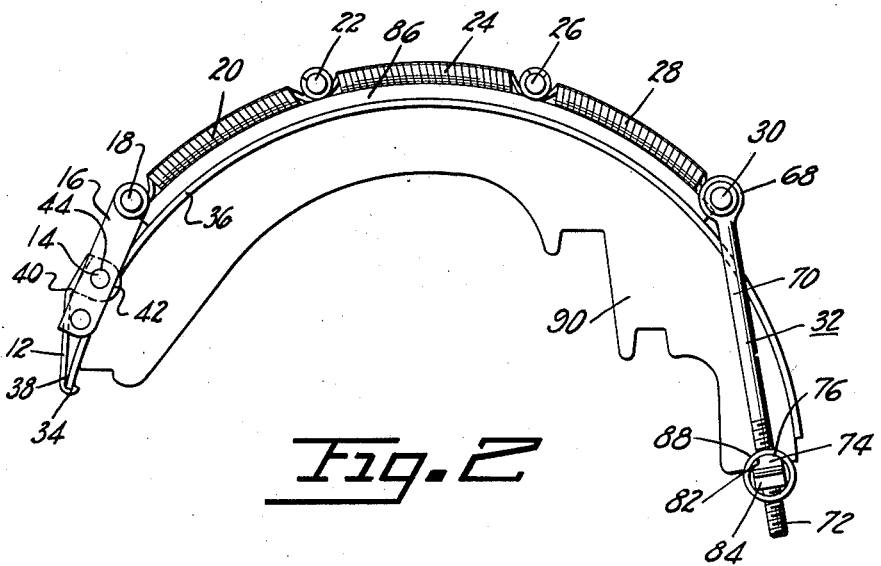
Figure 2 is a side view of a brake shoe assembly as prepared for the adhesive curing operation, showing the resilient clamping device in applied position on the shoe.

Referring to Figures 1 and 2, the resilient clamping device comprises, in general, a bracket member 12 which is adapted to be hooked to one end of the brake shoe, a laterally-extending pin 14 carried by the bracket member, a pair of links 16 pivotally connected to pin 14, a second laterally-extending pin 18 carried by the ends of links 16 remote from pin 14, a plurality of coil springs 20 arranged side by side and each connected at one end to pin 18, a third transversely-extending pin 22 to which the other ends of springs 20 are hooked, a second group of coil springs 24 each connected at one end to pin 22, a fourth laterally-extending pin 26 to which the other ends of springs 24 are hooked, a third group of coil springs 28 which are each connected at one end to pin 26, a fifth transversely-extending pin 30 to which the other ends of springs 28 are hooked, and a yoke element or member 32 which is connected to pin 30 and which is adapted to engage the end of the brake shoe remote from the member 12.

From the foregoing, it will be seen that the resilient clamping device includes a plurality of longitudinally spaced pins, or hinge members, which are interconnected by means of longitudinally extensible, or elastic, elements which provide a resilient radial pressure when the clamping device is bent around a curved surface.

The bracket member 12 has a hook-shaped end portion 34 which engages the end of the brake shoe rim 36, as illustrated in Figure 2. A sloping portion 38 of bracket member 12 joins the hook-shaped end portion 34 to the portion 40 which carries the radially inwardly extending ears 42. The ears 42 are apertured to receive the pin 14, previously referred to.

Each link 16 is preferably provided with at least two longitudinally spaced openings 44 which permit adjustment of the length of the clamping device to assist in adapting the same clamping device to shoes of different sizes. The bracket member 12 and the links 16 are retained in position on pin 14 by means of split washers 46, which fit into grooves provided on the pin. An additional groove 48 may be provided in one end of the pin to permit adjusting the device to wider shoes.

Pin 18, which extends through apertures provided at the opposite ends of links 16, also is retained in position laterally by means of split washers 46, and has a groove 48 for purposes of width adjustment. Two washers 50 are used to space the hooked end portions 52 of the outer springs 20 from the links 16.

The opposite ends of springs 20 are provided with hooked portions 54 which encircle pin 22. This pin is also engaged by hooked end portions 56 of springs 24. Washers 58 are provided to space the end portions of the springs, and split washers 46 are used to retain the pins in position.

The hooks, or loops, 60 at the opposite ends of springs 24 engage pin 26, as do the loops 62 of springs 28. Spacing washers 58 and split washers 46 are used to complete the assembly of pin 26.

The loops 64 at the opposite ends of springs 28 engage the pin 30, which also extends through apertures 66 provided in the heads 68 of eye-bolts 70, which form the spaced side parts of yoke member 32. Suitable spacing washers 58 and split washers 46 are carried by pin 30. The ends 72 of the eye-bolts 70 are threaded, as shown, and carry nuts 74. The nuts 74 engage the left side 76 of tubular member or portion 78, which serves as the cross piece of yoke member 32. The walls of tubular member 78 opposite nut-engaging surface 76 are cut away, as shown at 80, to permit the nuts 74 to be screwed onto the threaded ends 72 of the eye-bolts after the tubular member 78 is in place. The nuts 74 are provided with cylindrically curved bottom surfaces 82 which engage the surface 76 of tubular member 78, thereby preventing the nuts from rotating when the surface 76 is held in engagement with the nuts. In order to prevent tubular member 78 from sliding to the left along the eye-bolts after the clamping device has been disassembled from the shoe, a leaf-spring 84 may be placed between the right side of the nuts 74 and the inner-surface of the outer portion of tubular member 78, the center of leaf-spring 84 thus being arranged to urge tubular member 78 outwardly, maintaining surface 76 in engagement with surfaces 82 of the nuts.

When the clamping device is snapped into place on the shoe assembly, it takes the position shown in Figure 2. The coil springs 20, 24, and 28 lie against the lining segment 86, and the tubular member 78 fits into a concave notch 88 provided in the end of the web 90 of the shoe. The arrangement is such that pins 18 and 30 are located at the opposite ends of the lining segment, thereby providing adequate localized pressure at the ends of the lining segment, which is an important factor in obtaining a satisfactory bond. Owing to the angular deflection of hook member 12 and yoke member 32 with respect to the other parts of the clamping device, the radial pressure on the lining is slightly greater at the ends of the segment than it is at points intermediate the length of the segment.

When the clamping device is snapped into place on the shoe assembly, radial pressures are developed against the lining which are substantially uniform throughout the length of the lining segment (except for a slight increase at the ends as explained above). This uniformity of pressure results in part from the fact that a temporary vibration in the coil springs 20, 24, and 28 is set up when the clamping device is snapped into position. This vibration tends to eliminate uneven tension caused by friction between springs and brake lining.

Prior to placing the clamping device in position on the shoe assembly, suitable adhesive material is applied between the brake lining segment 86 and the rim 36, preferably by being brushed onto the inner surface of the lining segment. After the assembling operation has been completed, the shoes are ready to be moved into a suitable heating area, which will effect a cure of the adhesive, thereby providing a permanent, infusible bond.

Figures 3 and 4 illustrate a modified version of the resilient clamping device, which is particularly adapted for use with a relatively long lining segment. As shown, the lining segment 86a extends almost the full length of the rim 36. Three sets of springs 20a, 24a, and 28a are provided, as before, but the springs in this version of the clamping device are considerably longer than those used in the clamping device of Figures 1 and 2. In order to place pin 18 near the left end of the lining segment, the links 16 are omitted, and pin 18 is connected directly to the ears 42 of bracket member 12. Pin 22 provides a hinge between springs 20a and springs 24a, and pin 26 provides a hinge between springs 24a and springs 28a, the latter springs being connected to pin 30, which is carried by the eye-bolts 70. As before, the eye-bolts form a part of yoke member 32a, which also includes a tubular cross piece 78. Because of the close similarity of the two versions of the clamping device, the same numerals are used in both modifications to indicate identical elements, whereas the letter "a" is added to those elements in Figures 3 and 4 which are similar to, but not identical with, corresponding elements in Figures 1 and 2.

Figure 6:
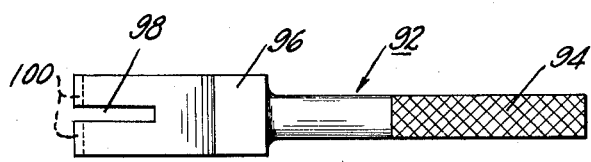
Figure 6 is a bottom view of the tool shown in Figure 5.

Figures 5 and 6 show the assembling tool 92, which is used in bringing the clamping device into applied position, Figure 5 showing the tool in position on the brake shoe during the assembling of the several elements. The tool 92, which acts as a lever in snapping the tubular member 78 into place in notch 88, has a handle 94 and a body portion 96. Body portion 96 is provided with a slot 98 to permit it to slide along the shoe web, and with outwardly extending projections 100 which prevent the tool from slipping past the rim of the shoe during assembling of the clamping device. As shown in Figure 5, the tubular cross piece 78 is pried into position by placing surface 102 of the tool against the end of the shoe rim and rotating the tool in a clockwise direction. When the tool is rotated in this manner, the tubular cross piece slides along the curved surface 104 provided on the back of the tool. The dotted outline of tool 92 in Figure 5 shows the position of the tool as the tubular member slips into place in notch 88.

The purpose of the curved surface 104 on which the tubular cross piece rides both during assembling and during disassembling of the clamping device is (a) to facilitate the operation by providing a continuously increasing leverage for the operator as the application of the clamp nears completion and the spring tension increases, and (b) to provide a gradual but positive stop for the clamp yoke when the tool is used for removal of the clamping device, thus preventing possible damage to the clamp or injury to the operator which might otherwise result from the suddenly released tension in the spring.

It is desirable, in order to facilitate assembling the resilient clamping device, to provide a suitable assembly stand to hold the several elements in position during application of the clamp. The assembly stand is preferably shaped to accomplish the following functions: (a) retain the lining in proper lateral position on the shoe while the clamp is being applied, (b) retain the lining segment in proper longitudinal position on the shoe while the clamp is being applied, and (c) guide the clamp laterally so that it will be properly centered when it snaps ito applied position. An assembly stand is not required for disassembling the clamping device.

In removing the clamp, the operation of the tool is simply reversed. In other words, it is placed in position between the shoe rim and the tubular cross piece 78 and rotated in a counterclockwise direction to pry the yoke member out of engagement with the shoe. The forked end of the tool is used to pry the yoke out of position, whereupon it will snap upwards under the influence of the spring tension until it comes to rest at some point on the curved working surface 104 of the tool.

Figure 7:
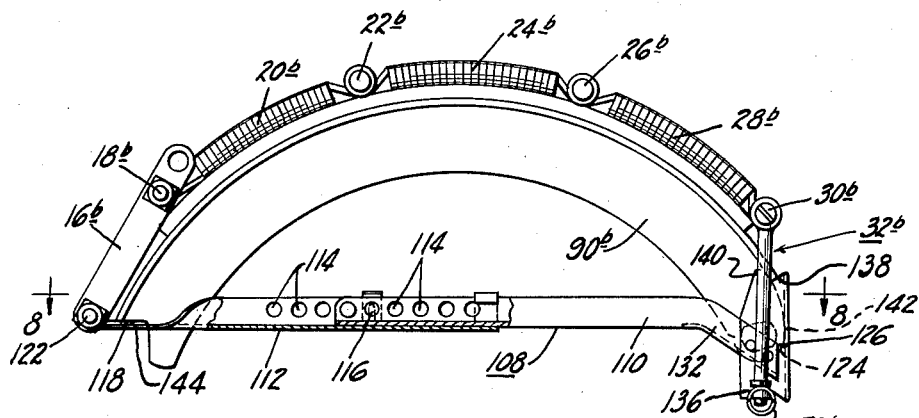
Figure 7 is a side view of a different form of the clamping device, in which an adaptor is provided to enable the device to be used on brake shoes which do not provide the same engagement surfaces as the shoes shown in previous modifications.
Figure 8:
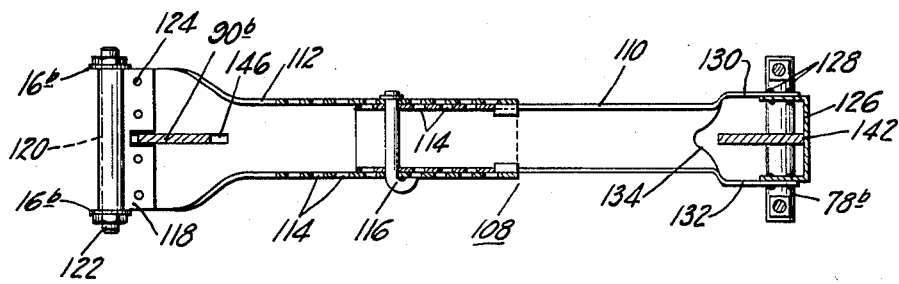
Figure 8 is a section taken on the line 8—8 of Figure 7.

Figures 7 and 8 illustrate the use of an adaptor which is used in applying the clamping device to shoe constructions differing somewhat from those shown in the preceding figures. A large proportion of the brake shoes being manufactured do not have a notched web end suitable for direct engagement with the clamping device. Furthermore, it may be required to use a clamping device of the type disclosed with a shoe rim which does not have a strengthening web attached thereto at the time of the bonding operation.

In order to make the clamping device universally available, I have developed an adaptor which permits it to be used in the situations discussed in the preceding paragraph. This adaptor may be provided as a separate element, or it may be assembled as an integral part of the clamping device, as shown in Figures 7 and 8.

Referring to the figures, the adaptor or member 108 extends diametrically across from one end of the shoe to the other. The adaptor may consist of telescoping sections 110 and 112 which permit longitudinal adjustment of the adaptor to make it fit shoes of different sizes. As shown, the inner portions of sections 110 and 112 are channel-shaped stampings, each of which has a plurality of spaced openings 114 in its sides. By shifting the cross-pin 116 to different holes in the sections the required adjustment is obtained.

The outer end or portion 118 of section 112 is folded over in such a way that it forms a bearing 120 for the pin, or bolt 122, the folded over portion being secured to the body portion of the section by rivets 124. Two links 16b are each pivotally mounted on pin 122 at one end, and carry pin 18b at the opposite end. Springs 20b connect pin 18b to pin 22b; springs 24b connect pin 22b to pin 26b; and springs 28b connect pin 26b to pin 30b, which is carried by yoke member 32b. (The resemblance of the several members which have been identified by numerals coupled with the letter "b" to their similarly numbered counterparts in preceding figures is readily apparent.)

Because the end of shoe web 90b is provided with a convexly-curved surface 124, the tubular cross-piece 78b of yoke member 32b cannot engage the shoe end directly, as in the other versions of the clamping device. A substantially channel-shaped strut member or portion 126 is secured to the outer end of section 110 of the adaptor by means of rivets 128. The outer end of section 110 consists only of the spaced side walls 130 and 132, the bottom portion of the adaptor section being discontinued at 134 to provide space for the end of the brake shoe.

The bottom of strut 126 is provided with a concave notch 136 which receives tubular member 78b. The upper end of the strut has an inclined surface 138, which engages the end of shoe rim 36b when the shoe is mounted on the adaptor. Preferably the abutment surface 138 extends across the strut member from one side to the other of the channel. To limit endwise movement of the shoe toward the left during the assembling operation, projections 140 are provided at the upper ends of the sides of strut member. Endwise movement of the shoe in the opposite direction is prevented by engagement of the end of the shoe web with the inner surface of the back of the strut, as shown at 142.

At the other end of the shoe, the rim 36b engages the flat surface 144, provided by end portion 118, and the web extends through the slot 146 in section 112 of the adaptor.

From the foregoing it will be seen that a resilient clamping device has been provided which exerts a substantially uniform radial pressure holding a lining segment against a shoe rim, although direct radial applying force is not utilized, the pressure being obtained by means of a longitudinally extensible, elastic clamping device which is operatively connected to the ends of the shoe. Thus tension along the circumference of the shoe is used both to provide the required radial pressure and to provide the necessary "follow-up" motion.

The shoe itself is used to provide the necessary rigidity to resist the circumferential forces developed by the resilient clamping device, thus avoiding the necessity of using bulky supporting members.

Although certain particular embodiments of my invention have been described, it will be understood by those skilled in the art that the objects of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:

1. A removable device for retaining a brake lining segment temporarily in tight engagement with a brake shoe rim comprising a bracket member having a hook-shaped end portion adapted to engage one end of the shoe rim and having laterally spaced radially extending ears, a yoke arranged to fit over and engage the opposite end of the shoe, said yoke including a pair of eye-bolts arranged to extend along opposite sides of the shoe and a laterally extending member secured to the ends of the eye-bolts and arranged to engage a concave notch in the end of the shoe web, a plurality of circumferentially-spaced laterally-extending pins adapted to lie across the periphery of the brake lining, one of said pins being supported in the heads of said eye-bolts, another of said pins being supported in the ears of said bracket member, a pair of links pivoted on the latter pin and each having a plurality of spaced openings to permit longitudinal adjustment, a third pin being carried by said links remote from the second pin, the remainder of the pins being located at selected intermediate points between the pin carried by the links and the pin carried by the eye-bolts, and a plurality of coil springs arranged in groups, each of said groups of springs providing a resilient connection in tension between two adjacent pins, each spring being connected at each end to one of the pins, said springs and intermediate pins constituting the connection between the pin carried by the links and the pin carried by the eye-bolts.

2. A removable device for retaining a brake lining segment temporarily in tight engagement with a brake shoe rim comprising a bracket member having a hook-shaped end portion adapted to engage one end of the shoe rim and having laterally spaced radially extending ears, a yoke arranged to fit over and engage the opposite end of the shoe, said yoke including a pair of eye-bolts arranged to extend along opposite sides of the shoe and a laterally extending member secured to the ends of the eye-bolts and arranged to engage a concave notch in the end of the shoe web, a plurality of circumferentially-spaced laterally-extending pins adapted to lie across the periphery of the brake lining, one of said pins being supported in the heads of said eye-bolts, another of said pins being supported in the ears of said bracket member, the remainder of the pins being located at selected intermediate points between the pin carried by the bracket member and the pin carried by the eye-bolts, and a plurality of coil springs arranged in groups, each of said groups of springs providing a resilient connection in tension between two adjacent pins, each spring being connected at each end to one of the pins, said springs and intermediate pins constituting the connection between the pin carried by the bracket member and the pin carried by the eye-bolts.

3. A removable device for retaining a brake lining segment temporarily in tight engagement with a brake shoe rim comprising an adaptor which extends diametrically across from one end to the other of said rim and which has surfaces engaging the opposite ends of the shoe, one end of said adaptor having a bearing formed therein, the other end of said adaptor having a concave notch, a yoke arranged to fit over and engage the notch in the adaptor, said yoke including a pair of eye-bolts arranged to extend along opposite sides of the shoe, a plurality of circumferentially-spaced laterally-extending pins adapted to lie across the periphery of the brake lining, one of said pins being supported in the heads of said eye-bolts, another of said pins being supported in the bearing provided by the adaptor, the remainder of the pins being located at selected intermediate points between the pin carried by the bearing and the pin carried by the eye-bolts, and a plurality of coil springs arranged in groups, each of said groups of springs providing a resilient connection in tension between two adjacent pins, each spring being connected at each end to one of the pins, said springs and intermediate pins constituting the connection between the pin carried by the bearing and the pin carried by the eye-bolts.

4. A removable device for retaining a brake lining segment temporarily in tight engagement with a brake shoe rim comprising a bracket member having a hook-shaped end portion adapted to engage one end of the shoe rim, and having laterally spaced ears, a yoke arranged to fit over and engage the opposite end of the shoe, said yoke including a pair of laterally-spaced bolts arranged to extend along opposite sides of the shoe and a laterally extending member secured to the ends of the bolts and arranged to engage a notch in the end of the shoe web, a plurality of circumferentially-spaced laterally-extending pins adapted to lie across the periphery of the brake lining, one of said pins being connected to said bolts, another of said pins being connected to said bracket member, the remainder of the pins being located at selected intermediate points between the first two pins, and a plurality of coil springs arranged in groups, each of said groups of springs providing a resilient connection in tension between two adjacent pins, each spring being connected at each end to one of the pins, said springs and intermediate pins constituting the connection between the first two pins.

5. A removable device for retaining a brake lining segment temporarily in tight engagement with a brake shoe rim comprising an adaptor which extends diametrically across from one shoe end to the other and which has surfaces engaging the opposite ends of the shoe, one end of said adaptor having a bearing formed therein, the other end of said adaptor having a notch, a yoke arranged to fit over and engage the notch in the adaptor, said yoke including a pair of laterally-spaced bolts arranged to extend along opposite sides of the shoe, a plurality of circumferentially - spaced laterally - extending pins adapted to lie across the periphery of the brake lining, one of said pins being connected to said bolts, another of said pins being supported in the bearing provided by the adaptor, the remainder of the pins being located at selected intermediate points between the first two pins, and a plurality of coil springs arranged in groups, each of said groups of springs providing a resilient connection in tension between two adjacent pins, each spring being connected at each end to one of the pins, said springs and intermediate pins constituting the connection between the first two pins.

6. A removable device for retaining a brake lining segment temporarily in tight engagement with a brake shoe rim comprising a member having a hook-shaped end portion adapted to engage one end of the shoe rim, a yoke arranged to fit over and engage the opposite end of the shoe, said yoke including a pair of laterally-spaced side members arranged to extend along opposite sides of the shoe and a laterally extending member secured to the ends of the side members and arranged to engage a notch in the end of the shoe web, a plurality of circumferentially-spaced laterally-extending pins adapted to lie across the periphery of the brake lining, one of said pins being connected to said yoke, another of said pins being connected to the first-mentioned member, the remainder of the pins being located at selected intermediate points between the first two pins, and a plurality of longitudinally extensible springs arranged in groups, each of said groups of springs providing a resilient connection in tension between two adjacent pins, each spring being connected at each end to one of the pins, said springs and intermediate pins constituting the connection between the first two pins.

7. A removable device for retaining a brake lining segment temporarily in tight engagement with a brake shoe rim comprising a member which extends diametrically across from one shoe end to the other and which has surfaces engaging the opposite ends of the shoe, a yoke arranged to fit over and engage a notch in one end of said member, said yoke including a pair of laterally-spaced side members arranged to extend along opposite sides of the shoe, a plurality of circumferentially-spaced laterally-extending pins adapted to lie across the periphery of the brake lining, one of said pins being connected to said yoke, another of said pins being connected to the end of the first-mentioned member remote from the notch, the remainder of the pins being located at selected intermediate points between the first two pins, and a plurality of longitudinally extensible springs arranged in groups, each of said groups of springs providing a resilient connection in tension between two adjacent pins, each spring being connected at each end to one of the pins, said springs and intermediate pins constituting the connection between the first two pins.

8. A removable device for retaining a brake lining segment temporarily in tight engagement with a brake shoe having a web and a rim comprising a member having a hook-shaped end portion adapted to engage one end of the shoe rim, a yoke arranged to fit over and engage a notch in the shoe web adjacent the opposite end of the shoe rim, a plurality of circumferentially-spaced laterally-extending pins adapted to lie across the periphery of the brake lining, one of said pins being connected to said yoke, another of said pins being connected to the first mentioned member, the remainder of the pins being located at selected intermediate points between the first two pins, and a plurality of longitudinally extensible springs arranged in groups, each of said groups of springs providing a resilient connection in tension between two adjacent pins, each spring being connected at each end to one of the pins, said springs and intermediate pins constituting the connection between the first two pins.

9. A removable device for retaining a brake lining segment temporarily in tight engagement with a brake shoe rim comprising a member which extends diametrically across from one shoe end to the other and which has portions engaging the opposite ends of the shoe, a yoke arranged to fit over and engage a notch in one end of said member, a plurality of circumferentially-spaced laterally-extending pins adapted to lie across the periphery of the brake lining, one of said pins being connected to said yoke, another of said pins being connected to the end of said member remote from the notch, the remainder of the pins being located at selected intermediate points between the first two pins, and a plurality of longitudinally extensible springs arranged in groups, each of said groups of springs providing a resilient connection in tension between two adjacent pins, each spring being connected at each end to one of the pins, said springs and intermediate pins constituting the connection between the first two pins.

10. A removable device, for retaining a brake lining segment temporarily in tight engagement with a brake shoe rim, having a first portion adapted to engage one end of the shoe, a second portion adapted to engage the opposite end of the shoe, a plurality of circumferentially-spaced laterally-extending pins adapted to lie across the periphery of the brake lining, one of said pins being operatively connected to the first portion, another of said pins being operatively connected to the second portion, the remainder of the pins being located at selected intermediate points between the first two pins, and a plurality of longitudinally extensible spring members arranged in groups, each of said groups of springs providing a resilient connection in tension between two adjacent pins, each spring being connected at each end to one of the pins, said spring members and intermediate pins constituting the connection between the first two pins.

11. A removable device, for retaining a brake lining segment temporarily in tight engagement with a brake shoe rim, having a first portion adapted to engage one end of the shoe, a second portion adapted to engage the other end of the shoe, a plurality of circumferentially-spaced laterally extending pins adapted to lie across the periphery of the brake lining, one of said pins being operatively connected to the first portion, one of said pins being operatively connected to the second portion, and one or more of said pins being located intermediate the first two pins, and a plurality of longitudinally-extensible spring members providing resilient connections between adjacent pins, said spring members and said intermediate pin or pins constituting the connection between the first two pins.

12. A combined spring clamping device and assembling tool for assembling and retaining in tight engagement a brake lining segment and brake shoe rim comprising a first member adapted to engage one end of the shoe, a second member adapted to engage the other end of the shoe, a longitudinally-extensible resilient connection between said members arranged to engage the periphery of the brake lining and thereby exert an evenly distributed radial pressure on said lining, and a tool usable as a lever to force one of the members over the end of the shoe, said tool being forked to embrace the shoe web and having projections adapted to engage the shoe rim to prevent the tool from slipping out of position during the assembling operation, and said tool having a curved back surface which engages the aforementioned member to pry it beyond the end of the shoe and cause it to slide into place against the shoe, the curvature of said surface being such that the leverage of the tool increases as the clamping device approaches maximum tension.

13. A combined spring clamping device and assembling tool for assembling and retaining in tight engagement a brake lining segment and brake shoe rim comprising a member having a first portion adapted to engage one end of the shoe, a second portion adapted to engage the other end of the shoe, and a longitudinally-extensible resilient connection between said portions arranged to engage the periphery of the brake lining and thereby exert an evenly distributed radial pressure on said lining; and a tool usable as a lever to force one end of said member over the end of the shoe, said tool having a curved back surface which engages the aforementioned member to pry it beyond the end of the shoe and cause it to slide into place, the curvature of said surface being such that the leverage of the tool increases as the clamping device approaches maximum tension.

WARD O. CROSSMAN.

REFERENCES CITED

The following references are of record in the file of this patent:

UNITED STATES PATENTS

| Number | Name | Date |
|---|---|---|
| 1,600,672 | Janowski | Sept. 21, 1926 |
| 1,903,058 | McNaught | Mar. 28, 1933 |
| 1,990,642 | Evans | Feb. 12, 1935 |
| 2,139,876 | Bullington | Dec. 13, 1938 |
| 2,433,760 | Janes | Dec. 30, 1947 |
| 2,434,328 | McLane | Jan. 13, 1948 |

FOREIGN PATENTS

| Number | Country | Date |
|---|---|---|
| 347,697 | Great Britain | Apr. 23, 1931 |
| 765,561 | France | June 12, 1934 |